United States Patent
Ebsen et al.

(10) Patent No.: US 9,569,454 B2
(45) Date of Patent: Feb. 14, 2017

(54) SELECTIVE COMPRESSION OF OBJECTS IN A STORAGE COMPUTE DEVICE

(71) Applicant: Seagate Technology LLC, Cupertino, CA (US)

(72) Inventors: David Scott Ebsen, Minnetonka, MN (US); Ryan James Goss, Prior Lake, MN (US); Jeffrey L. Whaley, Minneapolis, MN (US); Dana Simonson, Owatonna, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 254 days.

(21) Appl. No.: 14/486,414

(22) Filed: Sep. 15, 2014

(65) Prior Publication Data

US 2016/0078045 A1    Mar. 17, 2016

(51) Int. Cl.
*G06F 17/30* (2006.01)

(52) U.S. Cl.
CPC ... *G06F 17/30153* (2013.01); *G06F 17/30221* (2013.01)

(58) Field of Classification Search
CPC ............. G06F 17/30; G06F 17/30864; G06F 17/30153; G06F 17/30221
USPC ................................... 707/600–899
See application file for complete search history.

(56) References Cited

U.S. PATENT DOCUMENTS

| | | | |
|---|---|---|---|
| 5,696,926 A | 12/1997 | Culbert et al. | |
| 5,960,465 A | 9/1999 | Adams | |
| 5,968,149 A * | 10/1999 | Jaquette | G06F 11/1616 710/1 |
| 7,197,189 B2 | 3/2007 | Adelmann | |
| 2013/0262538 A1 | 10/2013 | Wegener | |

* cited by examiner

*Primary Examiner* — Isaac M Woo
(74) *Attorney, Agent, or Firm* — Hollingsworth Davis, LLC (57) ABSTRACT

Methods and apparatuses facilitate receiving a command via a host interface of a storage compute device to perform a computation on one or more data objects. The computations producing intermediate objects that are stored in data storage section of the storage compute device. A determination is made to compress and decompress the intermediate objects as they are moved between the data storage section and a compute section based on wear of a storage medium being reduced in response to the compression and decompression. The intermediate objects are compressed and decompressed as they are moved between the data storage section and the compute section in response to the determination.

20 Claims, 7 Drawing Sheets

SELECTIVE COMPRESSION OF OBJECTS IN A STORAGE COMPUTE DEVICE

SUMMARY

The present disclosure is related to storage compute devices. In one embodiment, methods and apparatuses facilitate receiving a command via a host interface of a storage compute device to perform a computation on one or more data objects. The computations producing intermediate objects that are stored in data storage section of the storage compute device. A determination is made to compress and decompress the intermediate objects as they are moved between the data storage section and a compute section based on wear of a storage medium being reduced in response to the compression and decompression. The intermediate objects are compressed and decompressed as they are moved between the data storage section and the compute section in response to the determination.

These and other features and aspects of various embodiments may be understood in view of the following detailed discussion and accompanying drawings.

BRIEF DESCRIPTION OF THE DRAWINGS

In the following diagrams, the same reference numbers may be used to identify similar/same components in multiple figures. The drawings are not necessarily to scale.

DETAILED DESCRIPTION

Some computational tasks are suited for massively distributed computing solutions. For example, data centers that provide web services, email, data storage, Internet search, etc., often distribute tasks among hundreds or thousands of computing nodes. The nodes are interchangeable and tasks may be performed in parallel by multiple computing nodes. This parallelism increases processing and communication speed, as well as increasing reliability through redundancy. Generally, the nodes may include rack mounted computers that are designed to be compact and power efficient, but otherwise operate similarly to desktop computer or server.

For certain types of tasks, it may be desirable to rearrange how data is processed within the individual nodes. For example, applications such as neuromorphic computing, scientific simulations, etc., may utilize large matrices that are processed in parallel by multiple computing nodes. In a traditional computing setup, matrix data may be stored in random access memory and/or non-volatile memory, where it is retrieved, operated on by relatively fast central processor unit (CPU) cores, and the results sent back to volatile and/or non-volatile memory. It has been shown that the bus lines and I/O protocols between the CPU cores and the memory can be a bottleneck for computations such as these.

This disclosure generally relates to use of a data storage device that performs internal computations on data on behalf of a host, and is referred to herein as a storage compute device. While a data storage device, such as a hard drive, solid-state drive (SSD), hybrid drive, etc., generally include data processing capabilities, such processing is mostly related to the storage and retrieval of user data. So while the data storage device may perform some computations on the data, such as compression, error correction, etc., these computations are invisible to the host. Similarly, other computations, such as logical-to-physical address mapping, involve tracking host requests, but are intended to hide these tracking operations from the host. In contrast, a storage compute device makes computations based on express or implied instructions from the host, with the intention that some form of a result will be returned to the host and/or be retrievable by the host.

While a storage compute device as described herein may be able to perform as a conventional storage device, e.g., handling host data storage and retrieval requests, such devices may include additional computational capability that can be used for certain applications. For example, scientific and engineering simulations may involve solving equations on very large matrices. Even though the matrices may be sparse, and therefore amenable to a more concise/compressed format for storage, the matrices may be cumbersome to move in and out of storage for performing operations.

While a conventional storage device can be used to store objects such as matrices, the device may not be given information that allows it to identify the objects. For example, host interfaces may only describe data operations as acting on logical block addresses (or sectors), to which the storage device translates to a physical address. In contrast, a storage compute device will obtain additional data that allows the storage device to manage the objects internally. This management may include, but is not limited to, selection of storage location, managing of object identifiers and other metadata (e.g., data type, extents, access attributes, security attributes), compression, and performance of single or multiple object computations and transformations.

Figure 1:
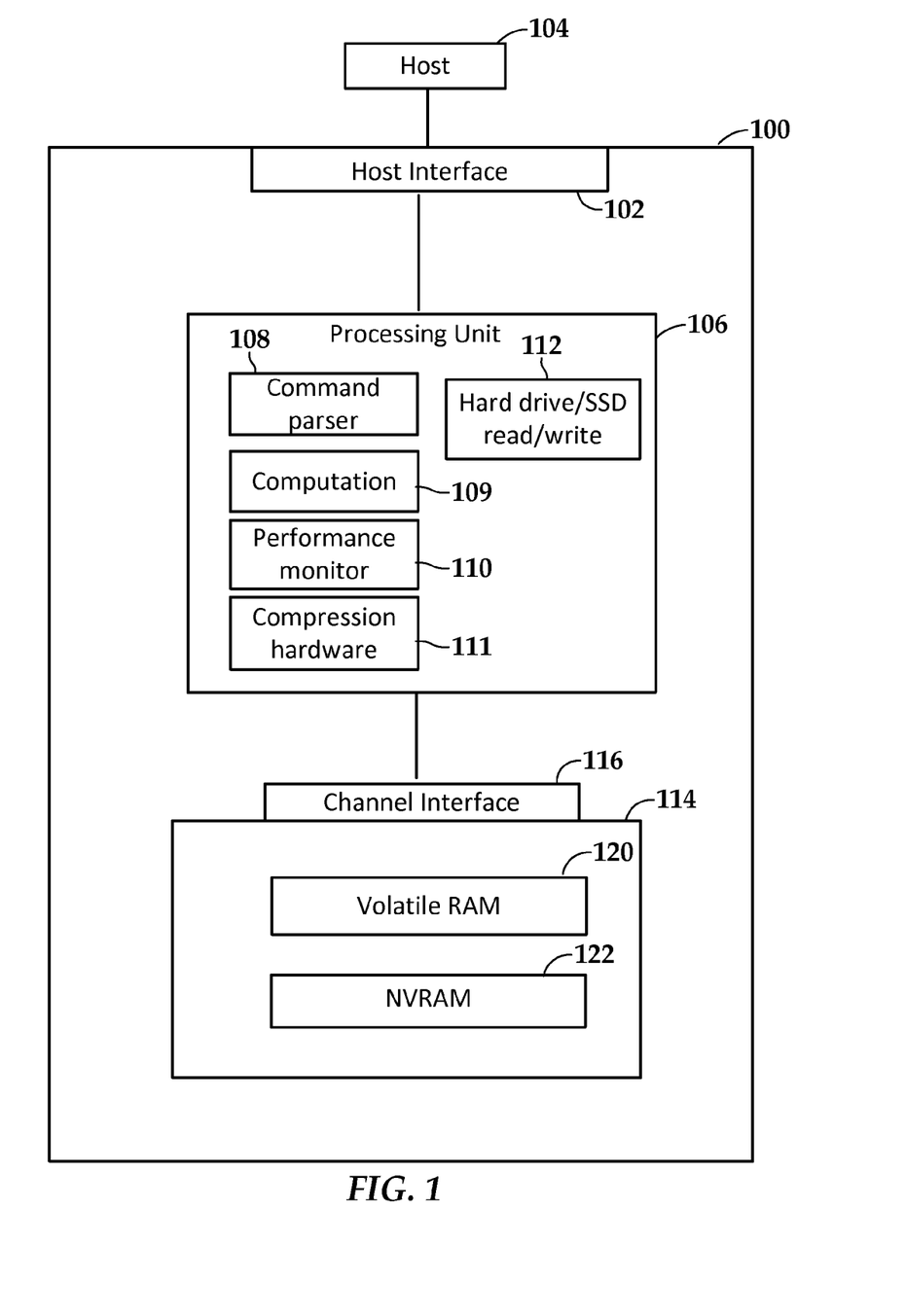
FIG. 1 is a block diagram of a storage compute device according to an example embodiment.

In embodiments described below, a storage compute device includes features for performing selective compression on objects when performing operations such as vector/matrix calculations. In FIG. 1, a block diagram shows a storage compute device 100 according to an example embodiment. The storage compute device 100 may provide capabilities usually associated with data storage devices, e.g., storing and retrieving blocks of data, and may include additional computation abilities as noted above. Generally, the storage compute device 100 includes a host interface 102 configured to communicate with a host 104. The host interface 102 may use electrical specifications and protocols associated with existing hard drive host interfaces, such as SATA, SaS, SCSI, PCI, Fibre Channel, etc.

The storage compute device 100 includes a processing unit 106. The processing unit 106 includes hardware such as general-purpose and/or special-purpose logic circuitry configured to perform functions of the storage compute device 100, including functions indicated in functional blocks 108-112. Functional block 112 provides legacy hard drive or SSD functionality, such as read, write, and verify operations on stored data. Blocks 108-111 represent specialized functionalities that allow the storage compute device 100 to provide internal computations on behalf of the host 104.

Block 108 represents a command parser that manages object-specific and computation-specific communications between the host 104 and storage compute device 100. For example, the block 108 may process commands that define objects (matrices, vectors, scalars, sparse distributed representations) and operations (e.g., scalar/matrix mathematical and logical operations) to be performed on the objects. A computation section 109 performs the operations on the objects, and may be specially configured for a particular class of operation. For example, if the storage compute device 100 is configured to perform a set of matrix operations, then the computation section 109 may be optimized for that set of operations. The optimization may include knowledge of how best to store and retrieve objects for the particular storage architecture used by the storage compute device 100, and how to combine and compare data objects.

A performance monitor 110 analyzes the operations performed by the computation section 109 and makes determinations about how to adapt data transfer operations to achieve particular performance goals. For example, the performance of matrix algebra may involve using intermediate objects. These intermediate objects may be transforms of matrices (e.g., inverse, transpose) or results of multiple matrix operations (e.g., sum, multiplication). The performance monitor 110 is configured to make a determination to compress and decompress the intermediate objects as they are moved between a data storage section 114 and the compute section 109. This determination may include, among other things, compression that reduces of a storage medium in the data storage section 114.

Compression hardware 111 may include hardware and firmware that is configured to compress and decompress objects, including the aforementioned intermediate computation objects. The compression hardware 111 may be under control of the performance monitor, and its operations may be invisible to the computation engine 109. The compression hardware 111 at least compresses and decompresses intermediate objects as they are moved between the data storage section 114 and the compute section in response to determinations made by the performance monitor 110. The compression hardware 111 may provide other functions, e.g., compressing objects in response to direct commands from the host 104.

As noted above, the functional blocks 108-112 at some point will access persistent storage, and this can be done by way of a channel interface 116 that provides access to the storage unit 114. There may be a multiple channels, and there may be a dedicated channel interface 116 and computation section 109 for each channel. The storage unit 114 may include both volatile memory 120 (e.g., DRAM and SRAM) and non-volatile memory 122 (e.g., flash memory, magnetic media). The volatile memory 120 may be used as a cache for read/write operations performed by read/write block 110, such that a caching algorithm ensures data temporarily stored in volatile memory 120 eventually gets stored in the non-volatile memory 122. The computation blocks 108, 109 may also have the ability to allocate and use volatile memory 120 for calculations. Intermediate results of calculations may remain in volatile memory 120 until complete and/or be stored in non-volatile memory 122.

As noted above, it is expected that intermediary objects may be too large in some instances to be stored in volatile memory 120, and so may be stored directly to non-volatile memory 122 while the calculation is ongoing. While non-volatile memory 122 may have slower access times than volatile memory 120, it still may be more efficient to work directly with non-volatile memory 122 rather than, e.g., breaking the problem into smaller portions and swapping in and out of volatile memory 122.

As noted above, the channel interface 116 may already be configured for parallel operations for conventional data storage. This parallelism may be extended for computation operations as well, as shown in the block diagram of FIG. 2. Generally, a storage compute device 200 includes multiple computation channels 202-205 that are coordinated by a device management component 206. There may be more or fewer channels than shown. The device management component 206 may include a general-purpose central processing unit and/or a custom logic circuit (e.g., field programmable gate array) that performs particular functions such as storage operations and computations. The device management component 206 may operate via an interface 208, e.g., a host interface or internal interface.

Figure 2:
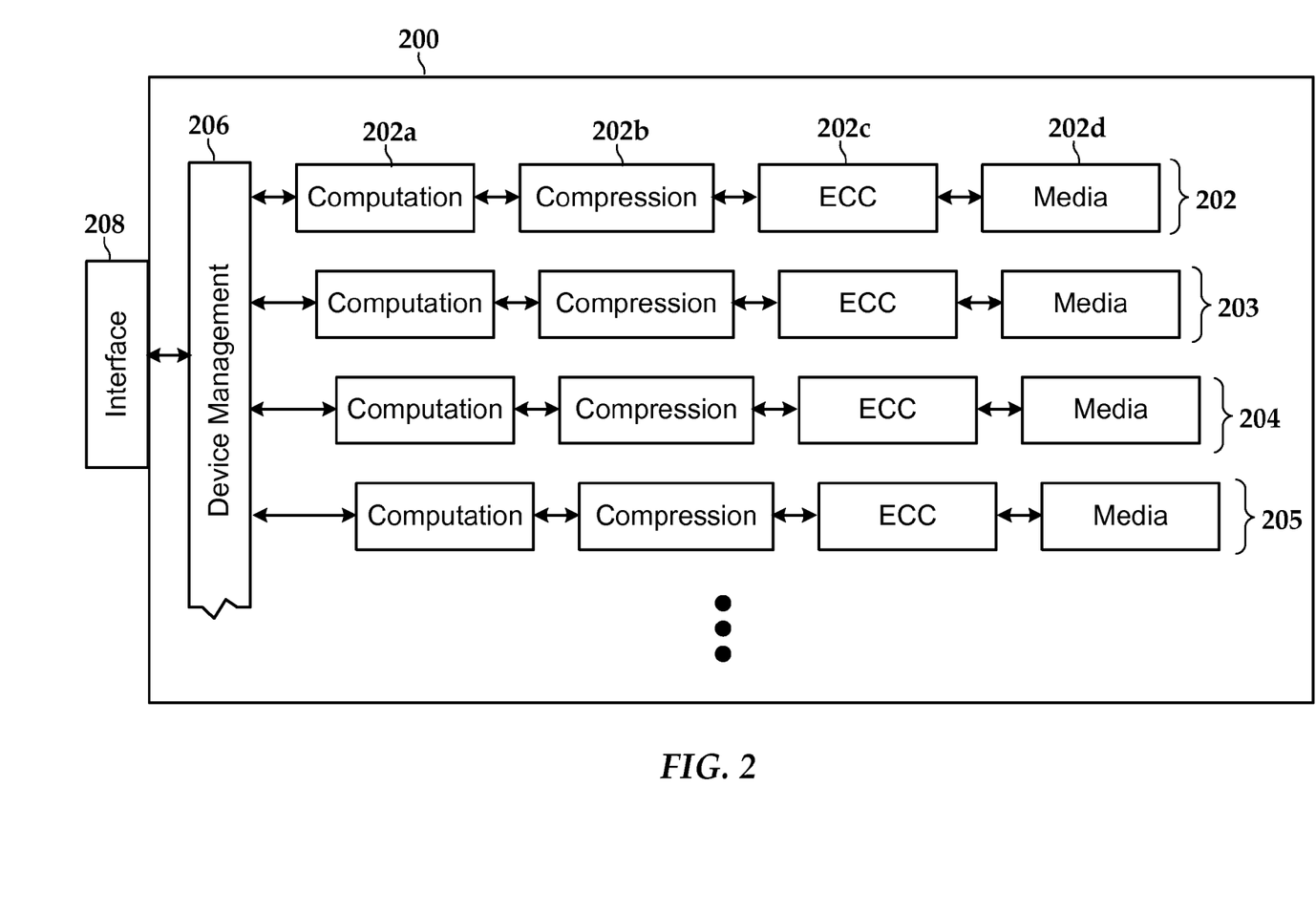
FIG. 2 is a block diagram showing multiple computation channels for a storage compute device according to an example embodiment.

Generally, the device management component 206 may analyze computations and determined how to allocate tasks between the channels 202-205. Using channel 202 as an example, it may include a computation section 202a, compression hardware 202b, error correction hardware 202c, and storage media 202d. The error correction hardware 202c and storage media 202d may be similar to those used in conventional devices, e.g., SSDs. Generally, the error correction hardware 202c adds error correction codes (ECC) to data encoded in the media 202d. The ECC is used to correct for channel and media errors when decoding data stored on the media 202d.

The computation section 202 is configured to perform part of a computation in parallel with computation engines of the other channels 203-205. The device management component 206 may decide on the division of work, divide the work accordingly, and dispatch the work to the channels 202-205. The device management component 206 or the computation section 202a may decide on an amount of compression appropriate to apply to data stored to media as part of the computation. This is communicated to the compression hardware 202b, which performs the appropriate compression and causes the data to be stored on the media 202d.

Generally, the storage compute device 200 may include a performance monitor (not shown) that provides guidance to the compression hardware 202b. This may be part of the computation section 202a, device management component 206, and/or an additional functional component. The performance monitor may receive 'hints' regarding compressibility from various other functional components. For example, the computation section 202a and/or device management component 206 may determine factors related to the intermediate data object itself, such as size, compressibility, how long the data object will be retained, etc. The performance monitor may also determine, e.g., from an interface to the storage media 202d, characteristics of the media 202d, such as capacity, speed, endurance, wear, etc. Using these and other hints (e.g., power consumption targets) the performance monitor can give directions to the compression hardware 202b regarding the type and level of compression to be used.

The compression hardware 202b may also utilize a convention for determining what compression was used on previously stored data so that the data can be decompressed when read back. This may involve writing headers to blocks of data that indicate compression characteristics. In another embodiment, a look up table or other data structure may be stored away from the data that indicates the compression characteristics. Any combination of these can be used so that any of the compression hardware units can determine the compression that was used to store the data, and thereby decompress the data appropriately when reading the data back.

The compression of data may affect other factors related to storage of the data. For example, each of the channels 202-205 may have access to two or more tiers of storage media. Such tiers may include different media types (e.g., hard disk, NAND flash, NOR flash, resistive memory, phase change memory, volatile memory) and different configurations of the same media (e.g., single-, multi-, or tri-level configurations of NAND flash; shingled or sectored disk partitions). The tier selected for storage of the object may be a deciding factor in the compression used on the object. Similarly, where the tier can be freely selected, the compression desired may be a deciding factor in which tier to store the data.

There may be interactions between the compression hardware 202b and error correction hardware 202c. Generally, compression removes redundancy in the data. As such, the data may be more susceptible to corruption if there are uncorrectable bit errors. As such, the compression used may also require more ECC data to be used. While adding ECC data may reduce the effectiveness of the compression somewhat, it may still reduce storage requirements significantly compared to uncompressed data.

As previously noted, a storage compute device may utilize different tiers of memory for storage of data objects, including intermediate objects. An example of tiered storage according to an example embodiment is shown in the block diagram of FIG. 3. A storage unit 300 includes different tiers 302-305 having different characteristics. An example of those characteristics is shown in each block, using the following codes: 'C'—capacity; '$S_R$'—random access speed; '$S_S$'—sequential access speed; 'R'—retention, and 'W'—wear. For simplicity, each of these is given a score from 1-10. Generally, retention will be 9 or 10 for most persistent storage, and 1 for volatile storage due to the possibility of losing data upon unexpected power loss. The wear parameter is a measure of one or both of how much life is left on the media and how susceptible the media is to wear based on read write cycles. A high number represents less wear and/or susceptibility to wear.

Figure 3:
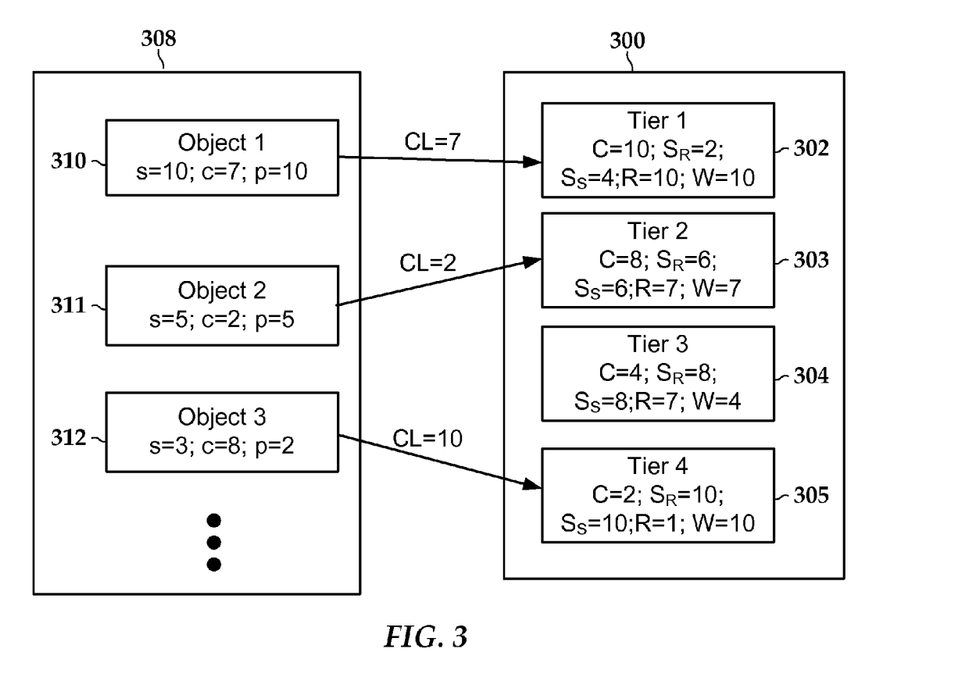
FIG. 3 is a block diagram illustrating the assignment of data objects to different tiers of memory according to an example embodiment.

A categorizer block 308 analyzes data object 310-312 as they are being processed. This processing may include initial storage of data objects (e.g., sent to the storage compute device from a host) and/or intermediate objects created as part of a computation. Each of the objects is given a rating using the following codes: 'p'—persistence; 's'—size; and 'c'—compressibility. Again, these are given scores from 1-10. The categorizer block 308 chooses a tier for storage and a compression level based on the codes for the data objects 310-312 and tiers 302-305. The code CL on each line represents compression level, with 10 being maximum compression and 1 being no compression. Object 311 is large (s=10) and requires long-term storage (p=10) and is moderately compressible (c=7), and so is stored in tier based mostly on wear (W=10), capacity (C=10) and retention (R=10). Object 311 is medium sized (s=5) and not very compressible (c=2), and so is stored in tier 303 mostly due to its capacity (C=8) and wear (W=7). Object 312 is stored in tier The categorizer block 308 may balance a number of factors when determining which tier 302-305 to select for storage. For example, may balance the determination based on at least speed and life expectancy of the tier. While tiers 303 and 304 may be desirable storage locations due to their high speed ($S_R$, $S_S$), they may be subject to wear due to use, e.g., such as flash memory which has an estimated useful life measured in program/erase cycles. As such, the value of W may reflect this either based on total estimated life of the tier, and/or based on a current life remaining in the tier. In contrast, tier 302 may not experience significant wear based on read/write cycles (e.g., hard disk), although like many electronic devices may lose reliability over time (e.g., due to wear of mechanical or electrical components). In balancing speed with wear, the categorizer block 308 may use a composite score, e.g., $x*W+y*(S_R+S_S)$, where the score tends to favor slower tiers as the faster tiers exhibit wear.

In other configurations, the categorizer block 308 may balance capacity and life expectancy of the tier. For example, if one tier uses SLC memory in one tier and MLC memory in another, the SLC tier may be significantly smaller because SLC is relatively expensive per unit of storage. However, SLC memory generally lasts longer, and may be slightly faster than MLC. As such, the SLC memory may be preferred, except that its capacity may cause it to either be unable to store some large objects, or storage of objects may require moving existing data to another tier in order to make room. As such, the balance between the size (and possibly retention score) of the object may limit the number of objects selected for the SLC tier to relatively small and temporary objects.

Figure 4:
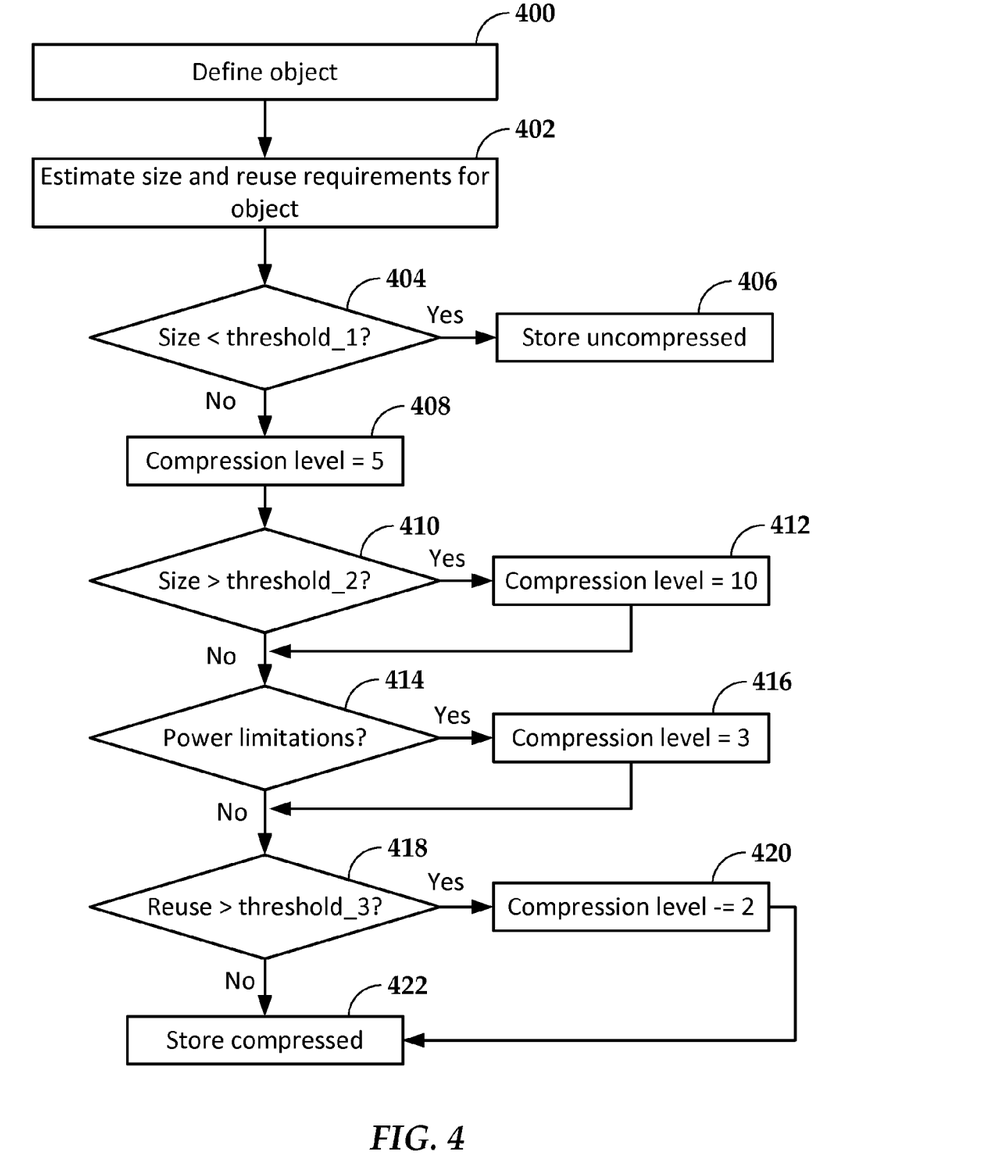
FIGS. 4-6 are flowcharts of methods according to example embodiments.

In FIG. 4, a flowchart illustrates a method according to an example embodiment. The method involves defining 400 an object that will at least be stored in a storage unit, and may be used at some point in an internal computation. This may involve receiving a definition of the object from a host, and/or receiving a command for performing a computation on stored objects. Once defined, an estimation 402 is made of size and reuse requirements of the object. For example, if the object is a matrix, the size may be estimated by row and column count of the full matrices, or vector and matrix sizes of a reduced expression of the matrix, e.g., for sparse matrices. The reuse requirements may include an estimate of how many times the object may be retrieved from the storage unit. For user-defined objects, this may be unknown, but may be estimated for intermediate objects. If the storage compute device is internally creating the objects for a known series of computations, it may be able to know how often the object needs to be swapped in and out of storage.

At block 404, the estimated size of the object is compared to a first threshold value. This is a relatively low value (e.g., less than a full page of memory), such that the object can be stored 406 stored without compression. If the size is above the first threshold, a default compression level is set at block 408. For purposes of this example, the compression levels range from 0-10, where 0 is no compression and 10 is the maximum compression. So the compression at block 408 is set to a middle value, which may balance computation resources versus storage resources.

At block 410, the estimated size is compared to a second threshold, this threshold being a fairly large value. If it is above the threshold, the compression level is set to the maximum value at block 412. At block 414, a check is made regarding power limitations, e.g., whether there is a need to conserve power via the compression hardware. If there are power limitations, the compression level is set at block 416 to a value that uses a lower amount of power while still providing some compression. It should be noted the arrangement of decision blocks 410, 414 reflects a priority of power savings versus maximum compression. The inverse can be achieved by reversing the order of blocks 414, 410.

At block 418, a check is made as to the level of reuse, e.g., compared to a third threshold. If there is a significant amount of reuse (e.g., more reads than writes), then compression may be reduced at block 420 to reduce the amount of decompression needed. After the compression level has been set, the object is stored 422 in a compressed format using the determined compression level. While this example determines a compression rate based on a series of decision blocks, alternate techniques may be used. For example, a weighted formula may determine a compression level based on various factors, e.g., compression level=a*size+b*power_available+c*reuse_level.

Figure 5:
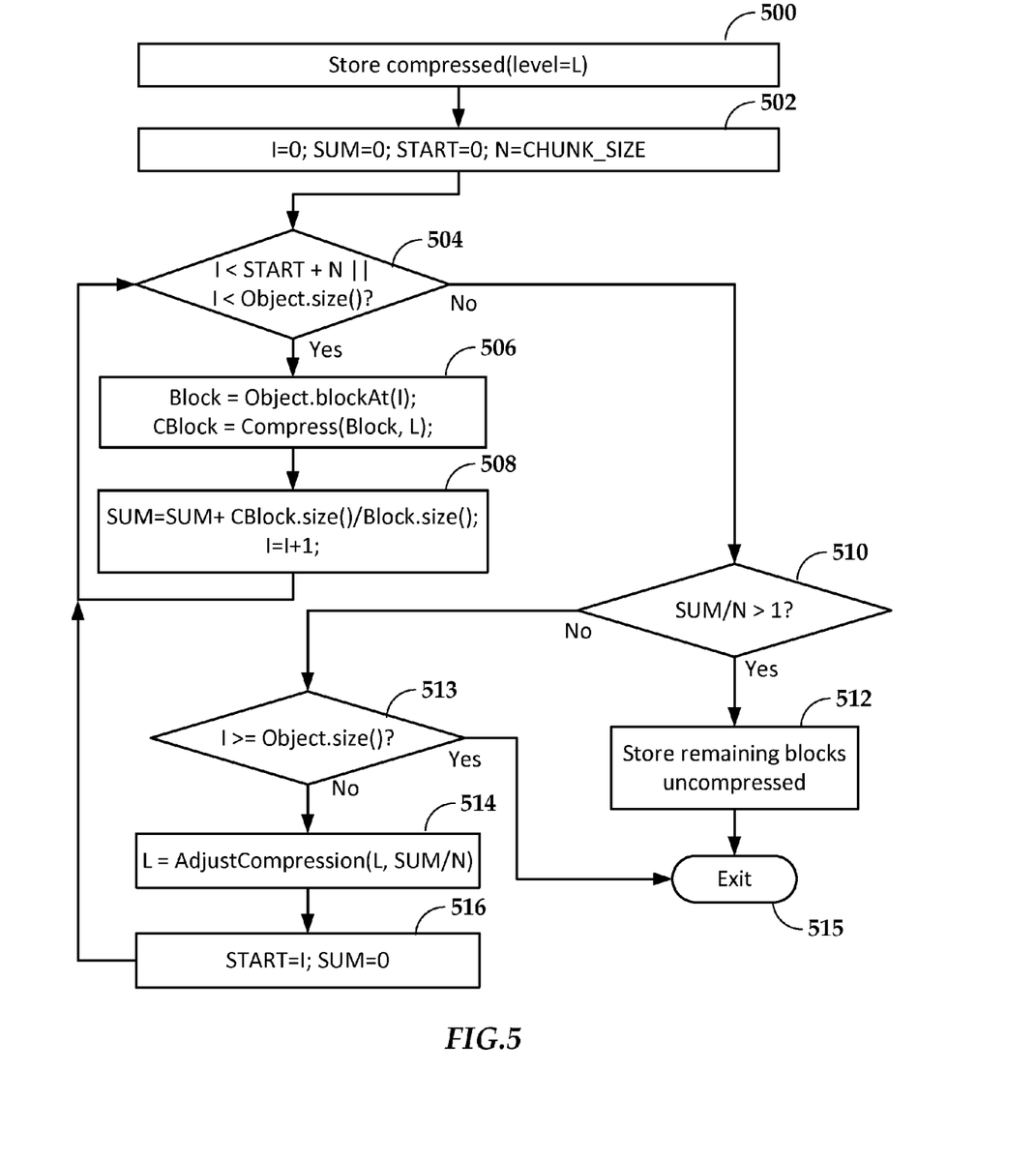

Generally, a system may not be able to determine beforehand how compressible an object is. Certain classes of data, such as text, are known to be highly compressible, while others, such as already compressed media (e.g., jpg, mp4) may not be compressible, and may actually expand the storage size of the object. Accordingly, the flowchart in FIG. 5 shows a method for incrementally compressing an object to determine the effectiveness as compression is occurring. Generally, the data object is divided into "chunks," which are small enough to test compressibility without using too many resources, but large enough to provide a useful indicator of compressibility. The chunk may be a fixed size (e.g., n-page sizes in memory) or proportional (e.g., 5% of total estimated size).

At block 500, the function is entered, and compression level L is passed into the function. At block 502, various counter and statistic variables are initialized. Block 504 is a loop limit, the loop iterating through blocks of the chunk. For example, if the object is 1,000 pages of memory, the chunk may be 50 pages and the blocks may be two pages each. For this example, the "pages" need not correspond to physical pages in the non-volatile memory, but represent a convenient size for the compression hardware, e.g., 4K blocks. At block 506, a block I is obtained from the object and compressed to obtain compressed block CBlock. At block 508, the compression ratio of the current block is added to the SUM value. The compressed blocks may be stored or buffered, as well as the uncompressed block for at least the first iteration of the loop.

The iteration of the loop ends at block 504 when the first chunk has been compressed. If it is determined at block 510 that the compression is increasing size (average compression ratio >1). Then the rest of the object is stored 512 uncompressed. The compressed version of the previously processed chunk may be kept stored in its compressed form, or may be discarded and the uncompressed value of the previously processed chunk stored instead. The block 510 may use some threshold value less than one, e.g., one end of an expected compression ratio range in view of the requested compression level.

After testing at block 510, block 513 tests whether the object has been fully processed, and exits 515 if so. If the compression ratio is acceptable, there may still be a desire to adjust compression parameter, which is shown at block 514. For example, if a power-consumption-intensive algorithm is being used with better than expected results, a lower-power-consumption algorithm may be attempted if it still achieves at or near the desired compression level L. At block 516, loop variables are reinitialized, and the next chunk is processed at block 504.

Figure 6:
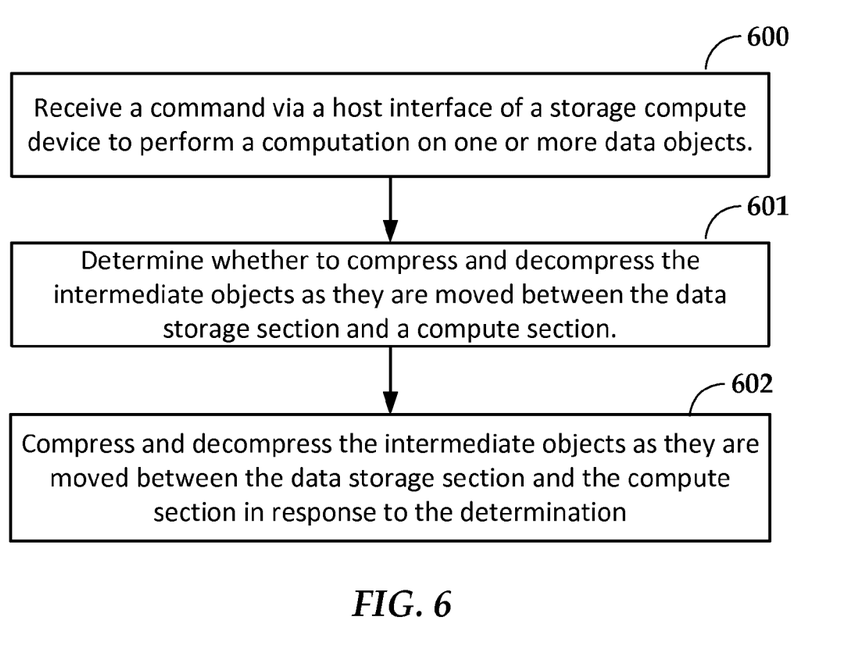

In FIG. 6, a flowchart illustrates a method according to another example embodiment. The method involves receiving 600 a command via a host interface of a storage compute device to perform a computation on one or more data objects. The computation produces intermediate objects that are stored in data storage section of the storage compute device. A determination 601 is made to compress and decompress the intermediate objects as they are moved between the data storage section and a compute section. The determination 601 is made at least based on wear of a storage medium being reduced in response to the compression, and may consider other factors, such as a tier of memory to which the intermediary object is stored. The intermediate objects are compressed and decompressed 602 as they are moved between the data storage section and the compute section in response to the determination 601.

Figure 7:
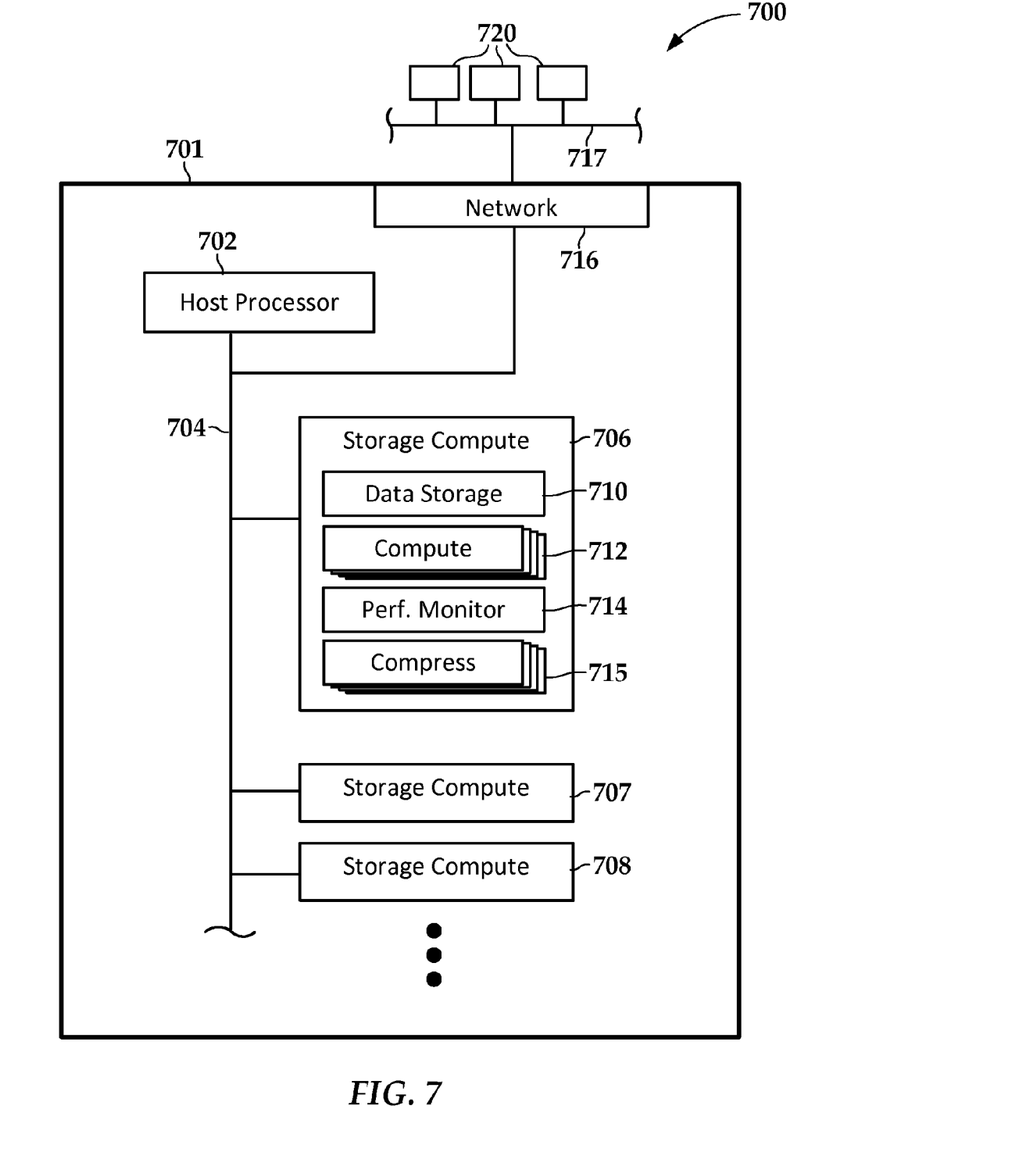
FIG. 7 is a block diagram of a system according to an example embodiment.

In reference now to FIG. 7, a block diagram illustrates a system 700 according to an example embodiment. The system includes a host device 701 with a host processor 702 that is coupled to a data bus 704. The data bus 704 may include any combination of input/output transmission channels, such as southbridge, PCI, USB, SATA, SaS, etc. On or more storage compute devices 706-708 are coupled to the data bus 704. As shown for storage compute device 706, each of the devices 706-708 includes a data storage section 710 that facilitates persistently storing data objects on behalf of the host processor. The data objects being internally managed by the storage compute device 706. The storage compute devices 706-708 include two or more compute sections 712 that perform computations on the data objects, and a performance monitor 714.

The performance monitor 714 makes a determination to compress and decompress the intermediate objects as they are moved between the data storage section 710 and the compute sections 712 based on wear of the storage medium being reduced in response. A compression hardware section compresses and decompresses the intermediate objects as they are moved between the data storage section 710 and the compute sections 712 in response to the determination.

The storage compute devices 706-708 may be able to coordinate distribution of parallel tasks (including providing guidance on data compression) on a peer-to-peer basis, e.g., without coordination of the host processor 702. In other arrangements, the host processor 702 may provide some or all direction in dividing inter-host distribution of tasks in response to resource collisions. If the distribution of tasks extends to the network 716, then the host processor 702 may generally be involved, at least in providing underlying network services, e.g., managing access to the network interface, processing of network protocols, service discovery, etc.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a non-transitory computer-readable medium and transferred to the processor for execution as is known in the art.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination and are not meant to be limiting, but purely illustrative. It is intended that the scope be limited not with this detailed description, but rather determined by the claims appended hereto.

What is claimed is:

1. A storage compute device comprising:
   a host interface that receives a command for the storage compute device to perform a computation on one or more data objects that are stored on the storage compute device by the host;
   a data storage section that facilitates persistently storing the data objects on a storage medium;
   a compute section that performs computations on the data objects in response to the command, the computations resulting in intermediate objects being created internally by the compute section for the computations, the compute section at least storing the intermediate objects in the data storage section;
   a performance monitor that makes a determination whether or not to compress and decompress the intermediate objects as they are moved between the data storage section and the compute section based on wear of the storage medium being reduced in response thereto; and
   a compression hardware section that compresses and decompresses the intermediate objects as they are moved between the data storage section and the compute section in response to the determination.

2. The storage compute device of claim 1, the data storage section further comprising a plurality channels each associated with separate portions of the storage medium, wherein the compression hardware comprises a plurality of compression units each independently coupled to one of the respective channels.

3. The storage compute device of claim 2, wherein the compute section further comprises a plurality of compute units each independently coupled to one of the respective compression units.

4. The storage compute device of claim 1, wherein the performance monitor further makes the determination based on power consumption not exceeding a threshold in response to compression and decompression of the intermediate objects.

5. The storage compute device of claim 1, wherein the data objects are internally managed by the storage compute device.

6. The storage compute device of claim 5, wherein the data objects comprise matrices.

7. The storage compute device of claim 1, wherein the storage medium comprises at least two tiers of storage, wherein the performance monitor makes the determination to compress and decompress the intermediate objects based on a tier to which the intermediate objects are to be stored.

8. The storage compute device of claim 7, wherein the performance monitor balances the determination based on at least speed and life expectancy of the tier.

9. The storage compute device of claim 7, wherein the performance monitor balances the determination based on at least capacity and life expectancy of the tier.

10. The storage compute device of claim 1, wherein the intermediate objects are created based on a mathematical combination of two or more the data objects.

11. The storage compute device of claim 1, wherein the performance monitor further selects a compression level for the intermediate object based on based on power limitations and requirements of the object.

12. A method, comprising:
   receiving a command from a host via a host interface of a storage compute device to perform a computation on one or more data objects that are stored in a data storage section of the storage compute device by the host, the computation producing intermediate objects that are stored in the data storage section of the storage compute device for the computations;
   making a determination whether or not to compress and decompress the intermediate objects as they are moved between the data storage section and a compute section based on wear of a storage medium being reduced in response thereto; and
   compressing and decompressing the intermediate objects as they are moved between the data storage section and the compute section in response to the determination.

13. The method of claim 12, wherein the compression and decompression is performed via a plurality of compression units each independently coupled to a respective channel, each channel associated with separate portions of the storage medium.

14. The method of claim 13, wherein the compute section further comprises a plurality of compute units each independently coupled to one of the respective compression units.

15. The method of claim 12, wherein the determination is further made based on power consumption not exceeding a threshold in response to compression and decompression of the intermediate objects.

16. The method claim 12, wherein the data objects are internally managed by the storage compute device.

17. The method of claim 16, wherein the data objects comprise matrices.

18. The method of claim 12, wherein the storage medium comprises at least two tiers of storage, wherein the determination to compress and decompress the intermediate objects is further made based on a tier to which the intermediate objects are to be stored.

19. The method of claim 18, wherein the determination is further based on at least speed, life expectancy, and capacity of the tier.

20. A non-transitory, computer-readable storage medium configured with instructions executable by a processor of a storage compute device to perform:
   receiving, via a host interface of the storage compute device, a command from a host to perform a computation on one or more data objects that are stored in a data storage section of the storage compute device by the host, the computation producing intermediate objects that are stored in the data storage section of the storage compute device for the computations;
   making a determination whether or not to compress and decompress the intermediate objects as they are moved between the data storage section and a compute section based on wear of a storage medium being reduced in response thereto; and
   directing compression hardware to compress and decompress the intermediate objects as they are moved between the data storage section and the compute section in response to the determination.

* * * * *